(12) United States Patent
Proctor (10) Patent No.: US 10,591,187 B2
(45) Date of Patent: Mar. 17, 2020

(54) THERMOACOUSTIC REFRIGERATOR (71) Applicants: David Proctor, Doncaster (AU); SIDDONS ENERTEC PTY LTD, South Yarra, Victoria (AU)

(72) Inventor: David Proctor, Doncaster (AU)

(73) Assignee: Siddons Enertec Pty Ltd, South Yarra, Victoria (AU)

( * ) Notice: Subject to any disclaimer, the term of this patent is extended or adjusted under 35 U.S.C. 154(b) by 217 days.

(21) Appl. No.: 15/516,311

(22) PCT Filed: Oct. 1, 2015

(86) PCT No.: PCT/AU2015/050594
§ 371 (c)(1),
(2) Date: Mar. 31, 2017

(87) PCT Pub. No.: WO2016/049703
PCT Pub. Date: Apr. 7, 2016

(65) Prior Publication Data
US 2017/0307261 A1  Oct. 26, 2017

(30) Foreign Application Priority Data

Oct. 2, 2014  (AU) .............................. 2014903931

(51) Int. Cl.
*F25B 9/14* (2006.01)
*B01D 53/00* (2006.01)
*F25J 3/06* (2006.01)
*F02G 1/00* (2006.01)
*F25J 3/00* (2006.01)

(52) U.S. Cl.
CPC ............ *F25B 9/145* (2013.01); *B01D 53/002* (2013.01); *F25J 3/061* (2013.01); *F25J 3/067* (2013.01); *F25J 3/0635* (2013.01); *B01D 2257/504* (2013.01); *F02G 1/00* (2013.01); *F25B 2309/1403* (2013.01); *F25B 2309/1405* (2013.01); *F25B 2309/1406* (2013.01); *F25B 2309/1407* (2013.01); *F25J 3/00* (2013.01); *F25J 2210/70* (2013.01); *F25J 2220/80* (2013.01); *F25J 2220/82* (2013.01); *F25J 2220/84* (2013.01); *F25J 2270/91* (2013.01); *Y02C 10/12* (2013.01)

(58) Field of Classification Search
CPC .... F25B 9/145; F25B 9/14; F25B 2309/1403; F25B 2309/1416; F02F 3/003; F02G 1/02
See application file for complete search history.

(56) References Cited

U.S. PATENT DOCUMENTS 5,467,722 A  11/1995  Meratla
5,953,921 A   9/1999  Garrett
(Continued)

FOREIGN PATENT DOCUMENTS

WO    WO 2008/028238 A1    3/2008

OTHER PUBLICATIONS

Written Opinion of the International Search Authority for PCT/AU2015/050594 dated Dec. 1, 2015, 7 pgs.

*Primary Examiner* — Elizabeth J Martin
(74) *Attorney, Agent, or Firm* — Martin & Ferraro, LLP (57) ABSTRACT

A thermoacoustic refrigerator includes at least one pair of pulse combustion tubes (10), preferably Rijke tubes, each tube (10) having a pair of spaced-apart Stirling engines (12), coupled together but with no separating membrane therebetween.

10 Claims, 11 Drawing Sheets

(56) References Cited

U.S. PATENT DOCUMENTS

| | | | |
|---|---|---|---|
| 6,164,073 A | 12/2000 | Swift et al. | |
| 6,732,515 B1 | 5/2004 | Weiland et al. | |
| 2003/0192324 A1 | 10/2003 | Smith et al. | |
| 2008/0110180 A1* | 5/2008 | Watanabe | F02F 3/003 |
| | | | 62/6 |
| 2010/0037627 A1* | 2/2010 | Proctor | B01D 53/002 |
| | | | 62/6 |
| 2011/0214407 A1* | 9/2011 | Brzek | F01D 5/28 |
| | | | 60/39.78 |
| 2014/0338369 A1* | 11/2014 | Hasegawa | F25B 9/145 |
| | | | 62/6 |
| 2015/0153100 A1* | 6/2015 | Zia | F25J 1/0022 |
| | | | 62/6 |

* cited by examiner

THERMOACOUSTIC REFRIGERATOR

CROSS REFERENCE TO RELATED APPLICATIONS

The present application is a U.S. National Phase Application under 35 USC § 371 of the International Patent Application No. PCT/AU2015/050594 filed Oct. 1; 2015 (published on Apr. 7, 2016 as WO 2016/049703); which claims priority to Australian Application No. 2014903931 filed Oct. 2, 2014; all of which are incorporated by reference herein in their entirety.

FIELD OF THE INVENTION

The present invention relates, in one aspect, to an improved method and apparatus for the separation and collection of gases. More particularly, but not exclusively, the invention relates to an improved method and apparatus for separating and collecting gases and other substances which are the end products of a combustion process or, in the alternative, are the natural constituents of gas streams emanating from gas and oil wells, chemical and bio-chemical processes, and the like.

BACKGROUND OF THE INVENTION

In another aspect the invention relates to an improved thermo-acoustic refrigerator, which lends itself readily to use in methods and apparatus of the type referred to in the preceding paragraph, as well as in a variety of other contexts.

In this day and age, with the ever-increasing publicity being given to the concept of "global warming" and means for reducing the effect thereof, much research has been and is being devoted to, and concentrated on, methods and apparatus for improving energy efficiency and the capture of pollutant emissions from, for example, combustion processes, as for example the burning of fossil fuels and the like. With continued exploration activities being directed to locating accessible supplies of gas and oil, much research has also been dedicated to methods and apparatus for the separation and collection of the natural constituents of gases from gas and oil wells. Existing and on-going research has been and is being directed to improving energy efficiency, reduction of what are referred to as sulphur oxide gases (SOx), and especially a reduction in, more preferably the elimination of, unburnt hydro-carbons, carbon monoxide (CO) and oxides of nitrogen (NOx).

With gases which are the product of a combustion process or the natural constituents of gas streams from gas and oil wells, and here reference is made in particular to gases containing $CO_2$ by way of example, in the case of the former such are normally at an elevated temperature, perhaps in the vicinity of 900° Centigrade. One known technique for separating such a mixture of gases into its constituents has been to utilise what is referred to as vapour compression refrigeration. However, a drawback associated with such vapour compression refrigeration is and has been that the compressors which need to be employed in any such process are expensive to both operate and maintain.

As an alternative to vapour compression refrigeration, attempts have been made to substitute vapour compression refrigeration with what is now known as thermo-acoustic refrigeration. In accordance with known techniques, thermo-acoustic refrigerators have been based on the employment of what are referred to as Rijke tubes. However, in practical terms such Rijke tubes have been found to be inefficient in their operation. In an attempt to improve efficiency, methods and apparatus have been adopted using stationary Stirling Hybrid Engines, wherein the moving piston is replaced by a gas piston.

THE PRIOR ART

The present invention relates to an improvement in or modification of known methods and apparatus for the separation of gases. The following prior art documents are referred to hereinafter by way of example only.

In U.S. Pat. No. 5,467,722 (Meratla), the process actually described does not work on LNG alone. In a practical sense a refrigeration process will be required, even if just for the gas turbine system which is part of the overall apparatus. The problem is, however, in terms of efficiency of operation of the refrigeration system.

In U.S. Pat. No. 5,953,921, the apparatus includes a single thermo-acoustic refrigerator or pulse tube refrigerator (PTR) which has a solid boundary between its two ends.

U.S. Pat. No. 6,732,515 uses an internal pulse combustion heater to and in driving the acoustic wave, as well as providing heat for Stirling engines. The disadvantage of such an arrangement is that is it unable to run at high pressure with an acoustically suitable gas, as for example helium, since a mass flow is present on top of the flow generated by the acoustic wave.

Current thermo-acoustic refrigerators are based on the use of a single Rijke tube (even those which employ Stirling Engines). However, experience has shown that a basic problem with such known refrigerators is how to allow for, or take care of, the reflected acoustic wave. Past attempts at resolving such a problem have principally involved or relied upon some form of convoluted geometry to produce inertance, as well as to get the timing right for the reflected acoustic wave to meet the acoustic wave in phase. However, such solutions have been found to suffer in terms of what is referred to as "an energy penalty", and in fact necessitate the addition of more heat to the "hot" end of the tube in order to increase the amplitude of the acoustic wave. Such an energy penalty is a principal disadvantage of known thermo-acoustic refrigerators.

Attempts have been made to reduce/lower the energy penalty by removing the previously-employed complex geometry from the orifice or "cold" end, and coupling two thermo-acoustic refrigerators together with one common orifice plate. Unfortunately, however, such an arrangement has still been found to provide a thermo-acoustic refrigerator which is not as efficient as a refrigerator of the vapour compression type.

In accordance with known practices most thermo-acoustic refrigerators are powered by external combustion processes, which give rise to the added complication that a heat recovery procedure cannot be applied to the exhaust stream without causing NOx levels to increase to an unacceptable degree. As a consequence, efficiency of the procedure is invariably compromised, at least to an extent. Another problem with conventional burners and recuperators is the generation of a large red hot zone, as is noted in the paper by W. C. Van Wijngaarden Thermo-Acoustic Refrigeration—A Stirling Concept for Offshore Associated Gas Liquefaction, presented at Monetizing Stranded Gas Reserves '99—Houston, Dec. 7-9, 1999, as being the most critical item. Pulse combustion heaters get round this through their higher heat transfer coefficients, lower required temperature differences and heat transfer area to deliver the same amount of heat.

An alternative to generating acoustic waves has been to employ vapour compression machines or compressor technology associated with, for example, Stirling engines. However, vapour compression machines have been found to suffer from the disadvantages of the need for costly maintenance, as well as the need for an external source of power, such as for example an electric motor, to drive the pulsing of the inert gas.

In accordance with one aspect of the present invention, therefore, there is provided a thermo-acoustic refrigerator, said refrigerator including at least one pair of pulse combustion tubes, in flow connection, each tube including two spaced-apart Stirling engines, disposed at respective "hot" and "cold" ends thereof, wherein the "hot" ends of the or each pair of tubes are coupled together, with no separating membrane.

In accordance with a further aspect of the present invention there is provided an apparatus for the separation of gases, said apparatus including: a source of gases, at an elevated temperature; and a thermo-acoustic refrigerator of the type as referred to in the preceding paragraph.

In accordance with yet another aspect of the present invention there is provided a method for the separation of gases from a stream of gases at an elevated temperature, said method including the steps of: subjecting said cooled stream of gases to a thermo-acoustic refrigeration process; and collecting said separated gases.

DESCRIPTION OF THE DRAWINGS

In order that the invention may be more clearly understood and put into practical effect reference will now be made to preferred embodiments of the invention. The ensuing description is given by way of non-limitative example only is with reference to the accompanying drawings, wherein.

DESCRIPTION OF PREFERRED EMBODIMENTS

Hereinafter reference will be made in particular to a preferred apparatus and method in accordance with the present invention, used for the removal of $CO_2$ (carbon dioxide) from a stream of mixed gases, whether that stream emanate from a combustion process or from a gas/oil well or the like. It should be understood, however, that the apparatus and method in accordance with the present invention are not be considered to be restricted merely to removal or separation of carbon dioxide. Indeed the apparatus and method are also suited for the removal or separation of other gases.

Figure 1:
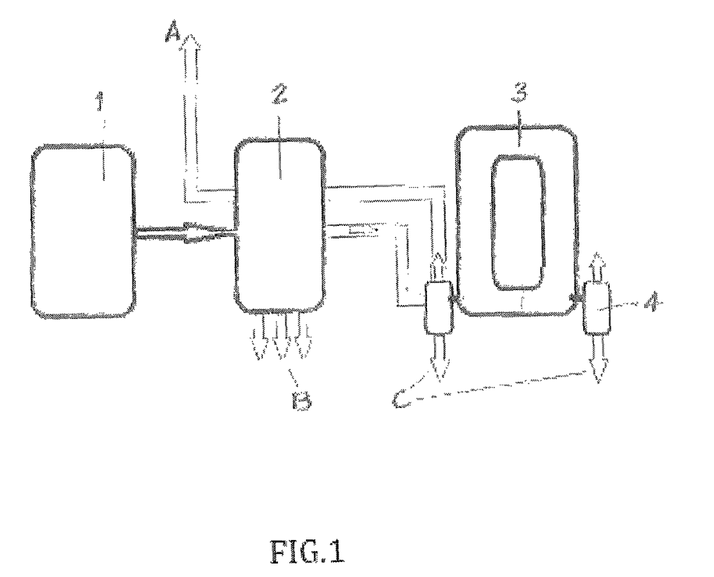
FIG. 1 is a schematic representation of an apparatus in accordance with one aspect of the present invention, to be employed for purposes of gas separation.

FIG. 1 shows a schematic representation of a general arrangement for an apparatus for gas separation in accordance with the present invention. Such utilizes a cooling process to condense and separate the mixed gases.

In general terms the overall apparatus of FIG. 1 includes a source 1 of gas(es), preferably including carbon dioxide and other gases, the gas(es) or gas stream being directed to a heat exchanger, or a bank of heat exchangers, generally designated 2. The heat exchanger(s) 2, or at least a first part or portion thereof, are used to at least partially cool down the incoming gas stream—which is at an elevated temperature—and which will contain carbon dioxide (among other gases). In accordance with previously employed methods and apparatus such hot gases would be sent through a waste heat boiler in order to raise/generate more steam, bringing the exhaust temperature down to something of the order of 200° C., in which case the first heat exchange could be ignored/omitted. Such heat exchanger(s) 2 can operate using any known and readily available coolant, as for example ambient air. It should be understood, however, that the nature and type of coolant used is not of the essence of the invention.

In a further heat exchange operation, in a second part or portion of the heat exchanger(s) the now warm (as distinct from hot) incoming gas stream (still containing carbon dioxide and other gases), is further cooled with a still cold stream of nitrogen, as well as remnant oxygen or other non-condensed gases, from the overall refrigeration system. This further heat exchanger system or apparatus is employed to remove at least the bulk of water from the incoming gas stream prior to the refrigeration/separation step.

A third or further part of the overall heat exchanger operation then acts to further cool the incoming gas stream using the coldest stream of nitrogen, remnant oxygen and/or other non-condensed gases, from the refrigeration system.

Whilst this has been described above as an arrangement of heat exchangers, it should be understood that the number and type of heat exchanger employed is not of the essence of the invention. Preferably three separate heat exchangers may be employed to achieve the three-stage cooling described earlier in this specification. Preferably what are known as plate-type heat exchangers may be utilized, as these can operate with the lowest temperature difference and pressure drop. In the preferred embodiment the incoming gas stream may be cooled to about −30° C., prior to being subjected to a thermo-acoustic refrigeration process.

In the embodiment shown schematically in FIG. 1, the arrow A shows a flow of gases (by-products) to air/atmosphere or to a separate storage means. Such gases could include $N_2$. Arrows B and C then show flows of condensed products from the heat exchanger 2 and toroidal gas separator 3 respectively. Flow B could include water ($H_2O$), hydrogen sulphide ($H_2S$) as well as oxides of nitrogen ($NO_X$) and oxides of sulphur ($SO_X$). Flow C, in a preferred embodiment may consist principally of carbon dioxide ($CO_2$). In real terms, however, the gases in flows A, B and C will be dependent upon the temperatures attained by the thermo-acoustic refrigeration.

The cooling and separation process in accordance with the present invention, apart from using heat exchangers as referred to in the preceding paragraph, also utilizes a thermo-acoustic type refrigerator or refrigerator system, generally designated 3 but to be described later in this specification in more detail. The energy to drive such a thermo-acoustic refrigerator 3 can be obtained from any suitable source. In an especially preferred embodiment, such may be provided by an external pulse combustion system 4 of any known type. The use of pulse combustion allows the overall thermal efficiency to be markedly increased when compared with current systems and apparatus, without incurring the penalties of increased emissions of environmentally damaging gases such as, for example, the various oxides of nitrogen. In that regard any of three known types of such pulse combustion systems, using either Helmholtz, Schmidt or Rijke tubes, may be employed for purposes of providing heat/energy to a Stirling type Engine which exists in a thermo-acoustic type refrigerator.

In this arrangement, the exhaust gases from the pulse combustion system may be heat exchanged with incoming combustion air, which enables the temperature at the hot end of the thermos-acoustic driver to be maintained at the highest possible value, commensurate with the materials of construction and the fuel gases being employed. The refrigeration process involved serves to remove the various gases from the incoming gas stream in a cascade process, except that is the nitrogen and remnant oxygen from the main combustion process or, in the case of methane sources, as for example gas wells, coal-mine ventilation exit shafts or bio-processes that produce methane, the sought after methane either as a gas or a liquid.

Figure 2:
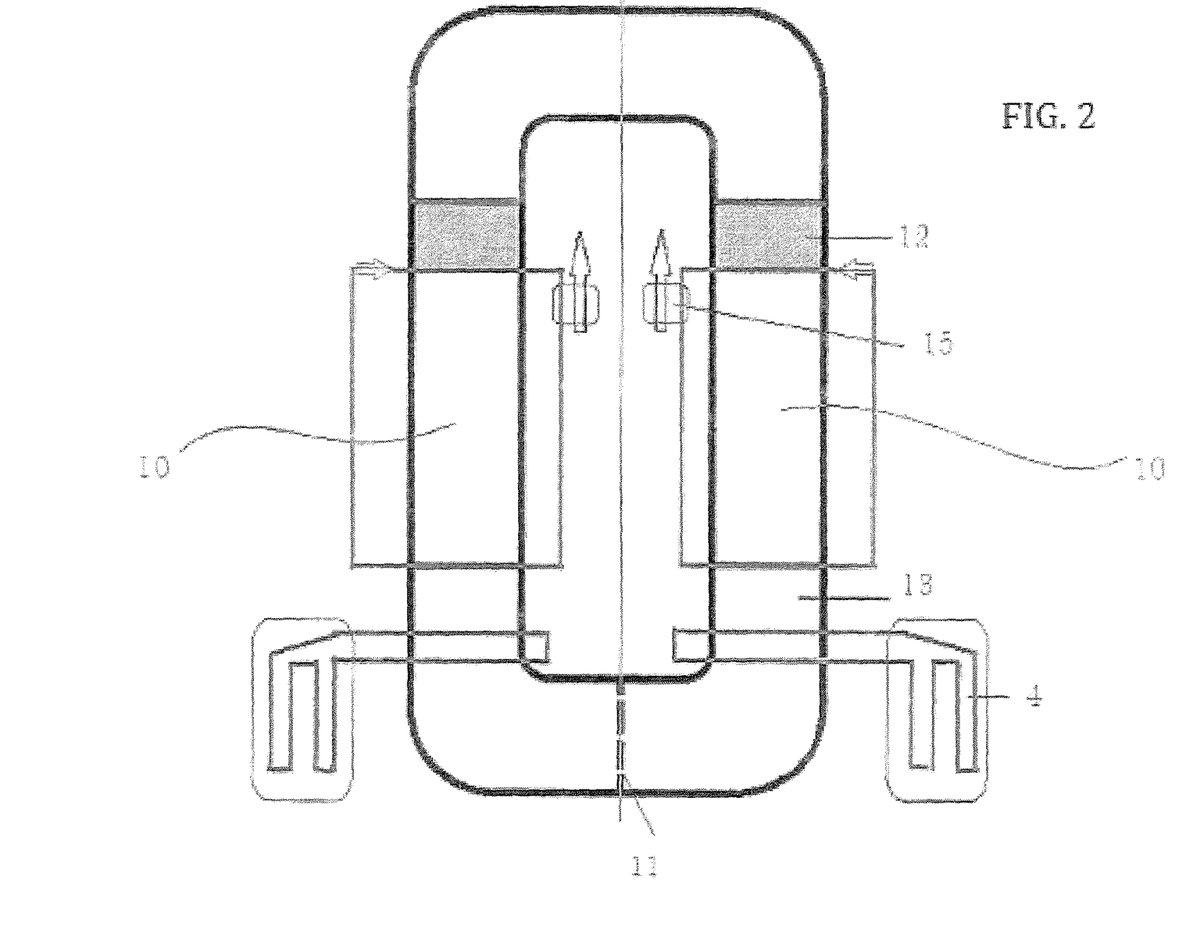
FIG. 2 is a schematic view of a toroidal gas separator (TGS) in accordance with an aspect of the present invention.

Turning then to FIG. 2, there is shown therein a preferred embodiment of a toroidal gas separator 3 in accordance with the invention for use in the layout of FIG. 1. Such is made up primarily of two tubes 10, adapted in use to be joined together—using any known method and means—in a substantially toroidal shape when viewed in cross-section. It should be understood, however, that the actual cross-sectional shape of the tubes 10 does not constitute part of the invention. The tubes 10, opposed, are joined together as shown, with an orifice plate separator 11 at the bottom thereof. Preferably such orifice plate will have a plurality of orifices. Each tube 10 includes, towards the top end thereof, what shall be hereinafter referred to as a "hot" Stirling engine 12, each powered/driven by a pulse combustion-type heater. Towards the bottom of each tube 10 will be a "cold" Stirling engine 13. Associated with each tube 10 will be a coolant loop, generally designated 14, for gases to be condensed in the operation.

In an especially preferred embodiment illustrated the gas separator may also include at least one air-to-liquid heat exchange 15 associated with each tube 10.

Figure 3:
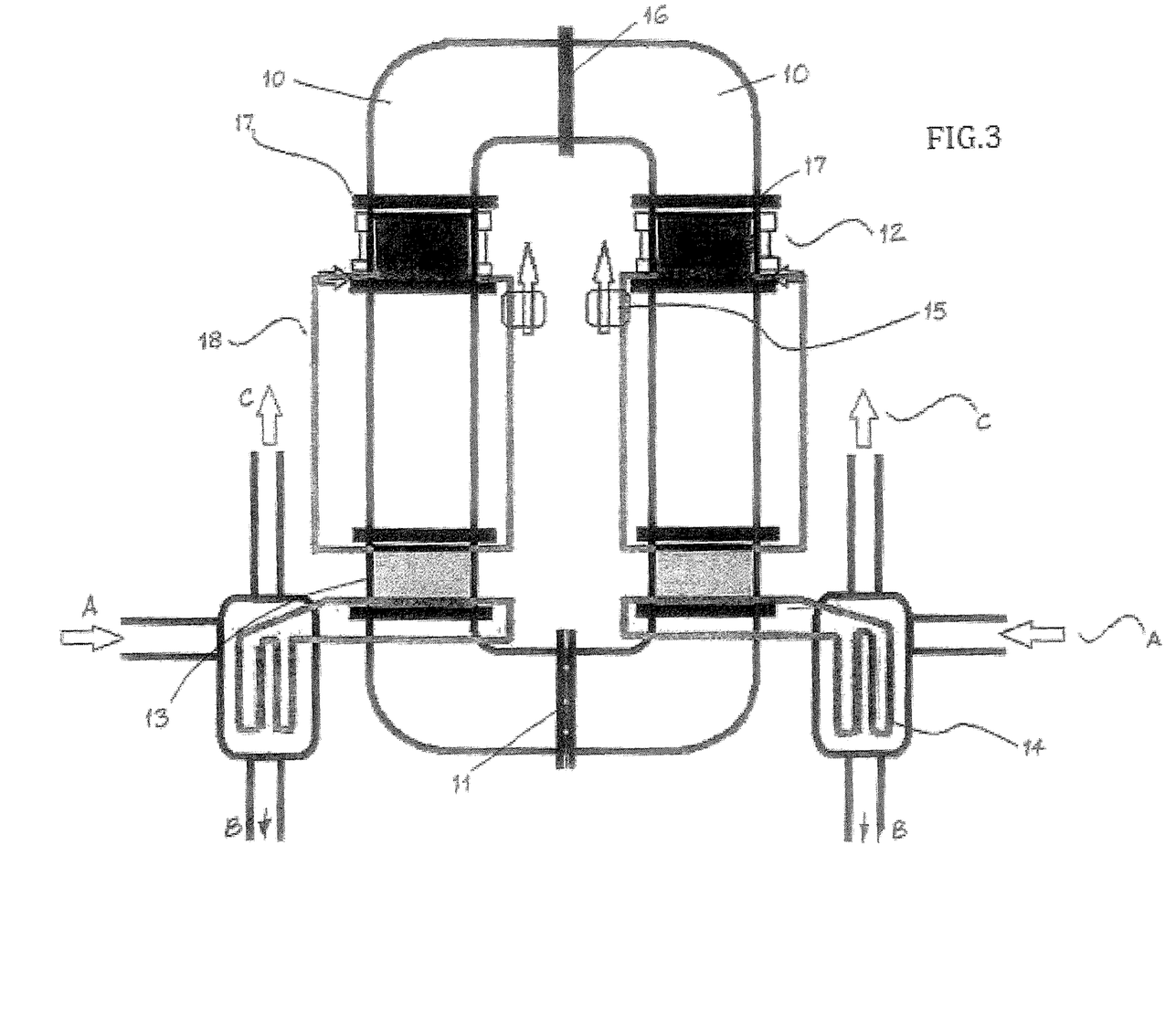
FIG. 3 is an elevational view of an especially preferred embodiment of a toroidal gas separator (TGS) in accordance with an aspect of the present invention.
Figure 4:
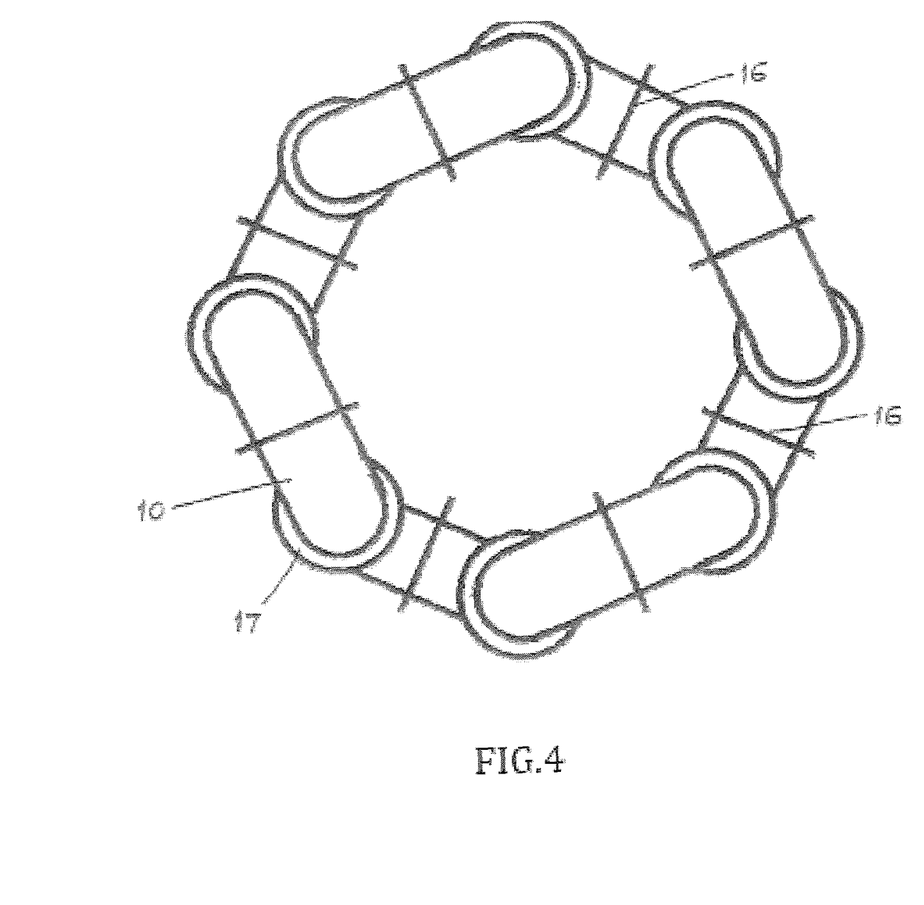
FIG. 4 is a top view of a plurality of linked toroidal gas separators in accordance with one aspect of the present invention.

With particular reference to FIG. 3, then, the two tubes 10 are connected together, at their upper ends, with the interposition of a connecting flange 16. The "hot" and "cold" Stirling engines are fitted into each tube 10 with the interposition of pairs of connecting flanges, generally designated 17.

Preferably, cooling/heating there exists in practice a loop, generally designated 18, between the "hot" and "cold" Stirling engines of each tube 10.

The arrangement is such that the gases to be separated, from a source of such gases, are directed (shown by arrows A) to the refrigerant loops 14. Exiting said loop 14 are streams of uncondensed gas, shown by arrow C, and of condensed gas, as shown by arrow B.

The especially preferred embodiment of a pulse combustion system for use in the method and apparatus of the present invention is the Rijke tube, or more correctly a plurality of such tubes inter-connected in pairs, principally by reason of the fact that such tubes are rather simple to both manufacture and use. This pairing also causes sound cancellation to occur, making the procedure quieter.

Utilization of a pulse combustion system results in the thermal efficiency of the cooling/separation process being substantially increased when compared with current and in use systems which are used to add heat to a Thermo-Acoustic Driver (TAD) or a Thermo-Acoustic Stirling Hybrid Engine (TASHE), without incurring the penalty of increased emissions of environmentally damaging gas, such as for example various oxides of nitrogen (NOx). Stirling engines employed in the apparatus in accordance with the present invention are constructed using conventional means, with the exception that the two ends of such an engine are to be anchored to the two temperature sources that cause motion in the sealed gas in which the Stirling engine is immersed. That gas is normally helium, used because of its acoustic properties, with the gas/helium being contained in a "tube" at preferably three MPa.

Parts of the insides of the main tubes of each of the thermo-acoustic refrigerator units are preferably sprayed with or covered with a ceramic coating, such as partially stabilised zirconia, PSZ, or similar material, in order to minimise the thermal stresses in the 'hot' and 'cold' ends of the main tubes. The parts of the main tube between the two 'hot' and 'cold' Stirling engines in the or each Rijke tube need not be coated.

The refrigeration process serves to remove the various gases from the incoming hot gas stream in a cascade process, with the exception of the nitrogen and remnant oxygen from the main combustion process or, in the case of methane sources, for example gas wells, coal mine ventilation exit shafts or bio-processes that produce methane, the sought-after-methane either as a gas or a liquid with other contaminant gases, such as $CO_2$, is removed.

The remnant cold stream made up principally of nitrogen and oxygen gases or other non-condensed gases, is now used to cool the incoming hot gas stream in the first heat exchanger, while itself being heated up to be put into the stack and discharged to atmosphere. The methane recovery process is dictated by whether the methane is required as a gas, or is itself to be liquified to LNG. If just methane gas is required the now cool methane may be used in the first heat exchanger to cool down the incoming raw methane stream containing water vapour, $CO_2$ and other minor quantities of different gases which are to be separated from the methane.

The $CO_2$ is now in a pure liquid state at high pressure, or in a solid state. The long term removal of $CO_2$ can be achieved in a variety of ways and is based on the fact that $CO_2$ remains in a liquid state provided the repository temperature is below 30° C. and the pressure is above 7150 kPa. The repository temperature has to be below −45° C. and the pressure is above 7150 kPa, if the $CO_2$ is deposited in the solid state for it to remain solid. The lower the available pressure in the repository, the lower the temperature has to be to keep the $CO_2$ in the desired state. Where the $CO_2$ is generated from an air-fuel combustion mixture, the process in accordance with the invention is capable of capturing all the $CO_2$ from the combustion process as well as from the incoming combustion air. Typically the incoming air contains 400 ppm of $CO_2$ and the out-going nitrogen-rich air contains 200 ppm of $CO_2$.

Figure 5:
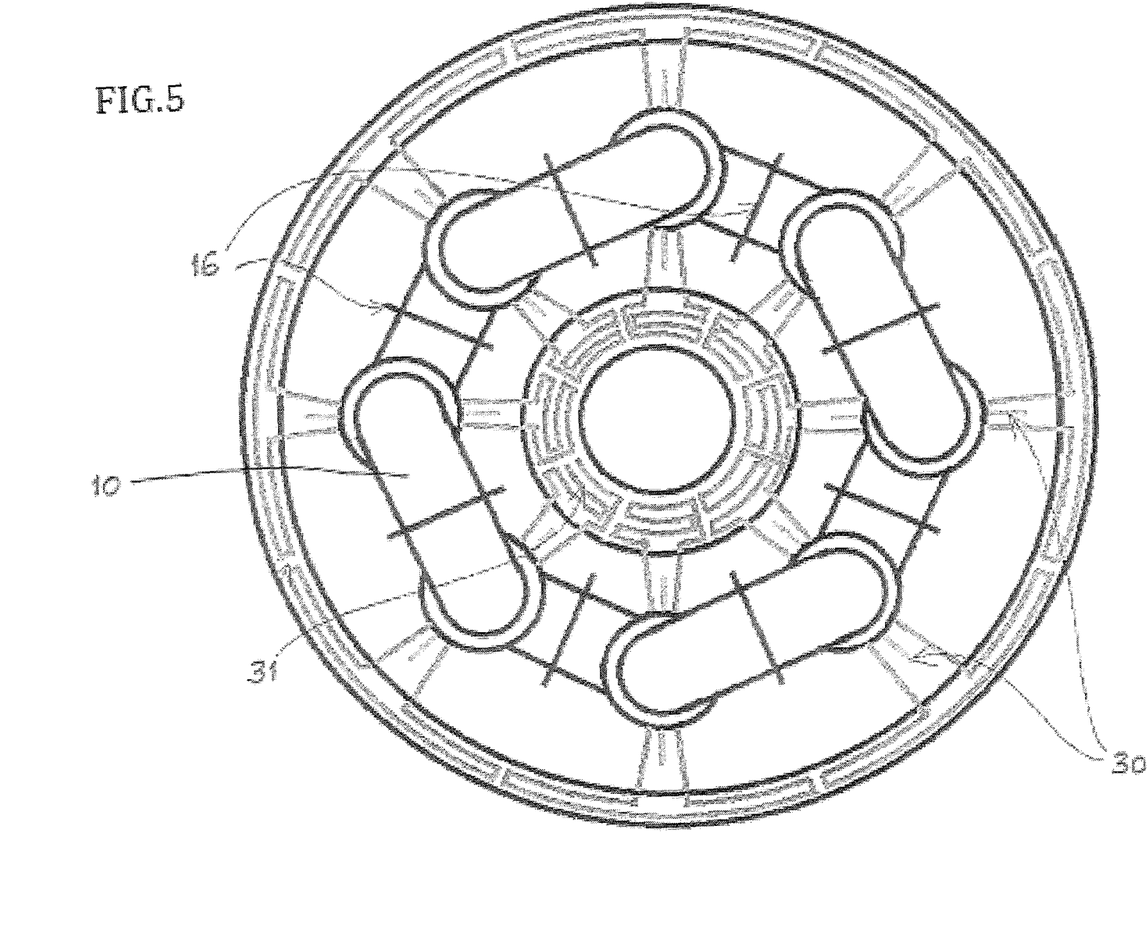
FIG. 5 is a further top view of a plurality of linked adapted/modified Rijke tubes.

In FIG. 5 the numeral 30 represents a heat transfer loop, in accord with a preferred embodiment of the invention, which serves to link "hot" end of the cold Stirling engine to the "cold" end of the hot Stirling engine in each tube 10. The numeral 31 then represents a heat exchange linked to the "cold" end of the cold Stirling engine.

Figure 8:
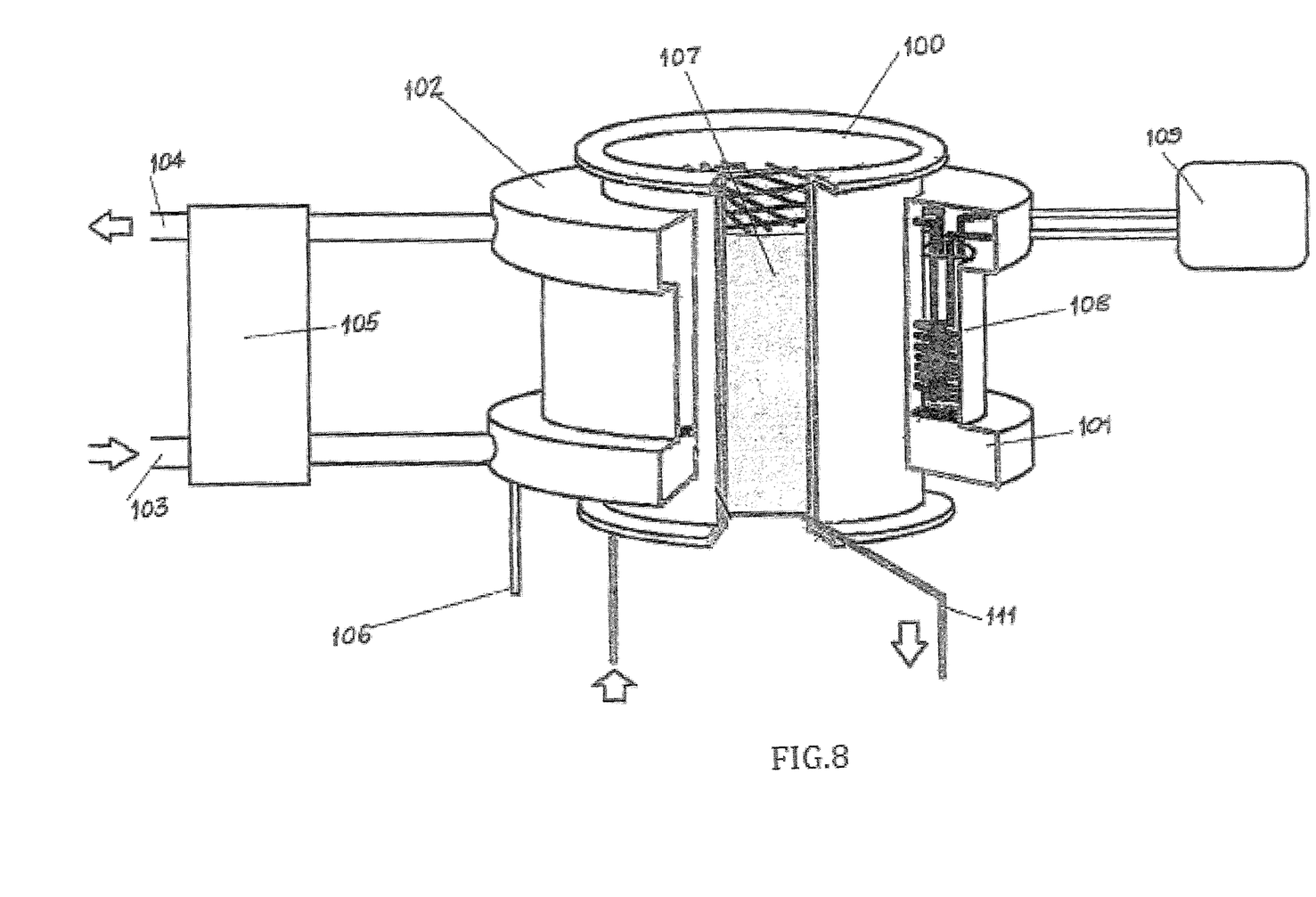
FIG. 8 shows a "hot" end Stirling engine with its Rijke tube pulse combustion heaters.

In the drawings, FIG. 8 shows a sectional view of a preferred embodiment of a "hot" end Stirling engine 12 of the type used in the method and apparatus of the present invention. Such can be seen to include, as principal components, a main tube 100, which can be of any suitable cross-sectional shape but which, in the preferred embodiment shown, is in the form of a hollow tube 100 of circular cross-section, an inlet decoupler 101, an outlet decoupler 102, respective inlet and outlet means 103 and 104 connected, respectively, to inlet decoupler 101 and outlet decoupler 102 with the interposition of a heat exchanger 105, preferably of the plate type. There is also included a means 106 for supplying fuel to the inlet decoupler. A Stirling engine stack 107 is appropriately disposed internally of the main tube 100. An array of Rijke tubes 108 will be disposed relative to the main tube 100 and "hot" end of the Stirling engine. In flow connection with the outlet decoupler 102 are a pump and heat transfer loop 109 to be associated with the "hot" end of the Stirling engine. A further heat transfer loop 111 can be associated with the "cold" end of that Stirling engine. The Stirling engine includes a hot grid at one end and a cold grid at the other, with a matrix of a suitable material in between the respective hot and cold ends.

A method for the separation of gases from a stream of gases at an elevated temperature, said method including the steps of: subjecting the stream to at least one heat exchange process, whereby to reduce the temperature thereof; subjecting said cooled stream of gases to a thermo-acoustic refrigeration process; and collecting said separated gases.

Figure 9:
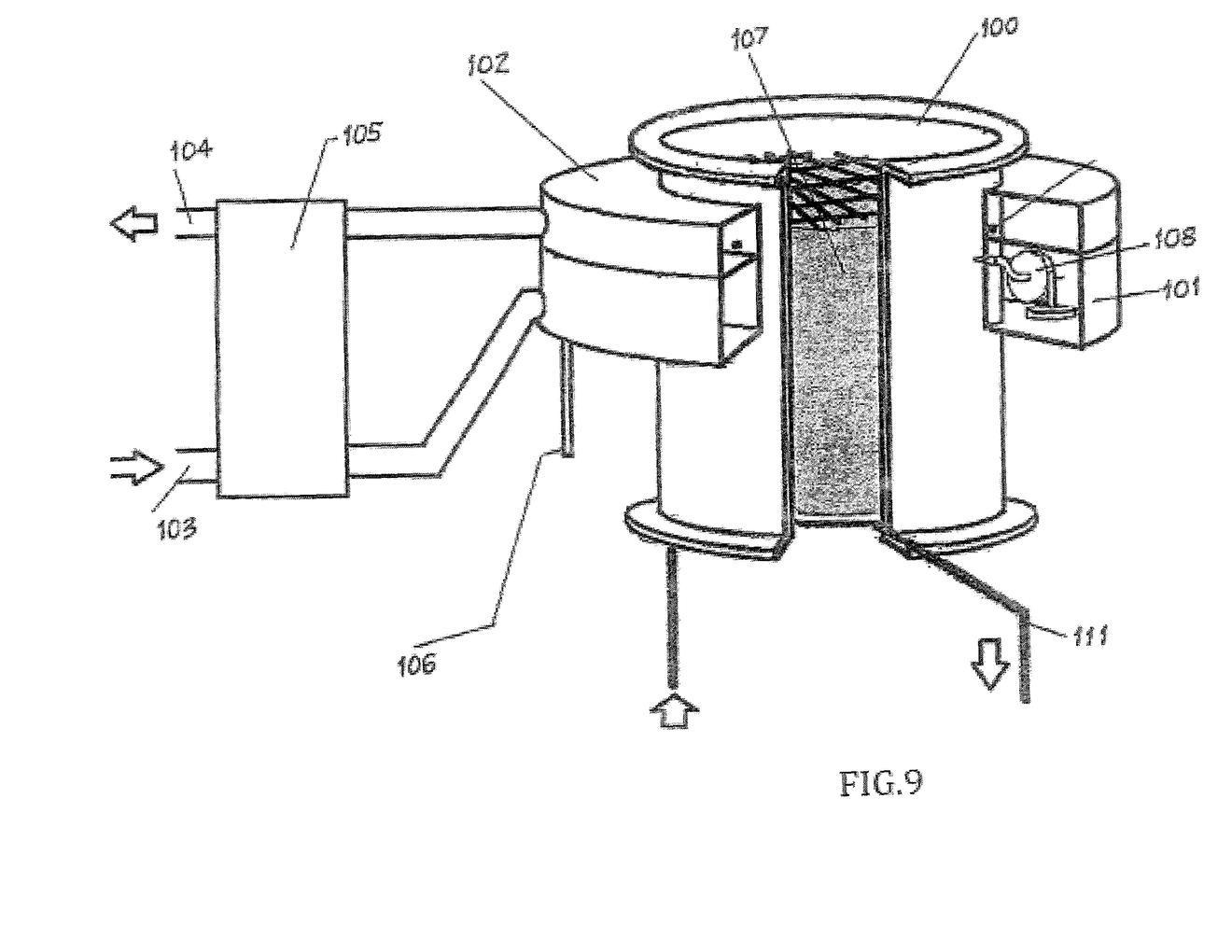
FIG. 9 is a "hot" and Stirling engine with Helmholtz pulse combustion heaters.

Such an alternative arrangement is shown in FIG. 9 with like numerals representing the same components as in the embodiment of FIG. 8, apart that is from 108 referring, in FIG. 9, to a Helmholtz pulse combination heater/chamber, rather than to a Rijke tube.

Figure 7:
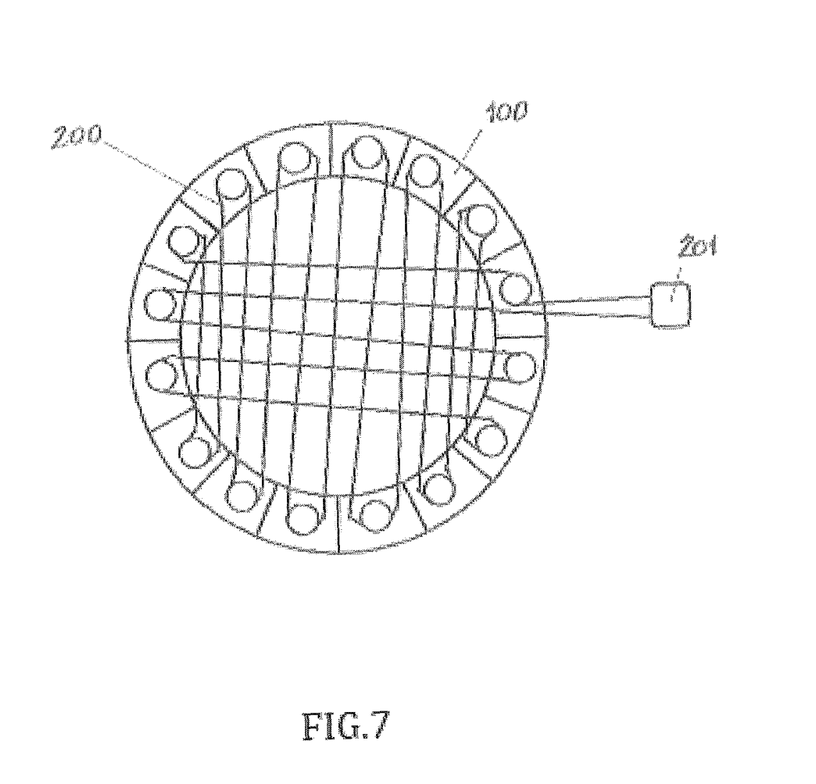
FIG. 7 shows a preferred embodiment of a heat transfer grid as it exists between Rijke tube pulse combustors and a main tube in accordance with a preferred embodiment of apparatus in accordance with the present invention.

FIG. 7 shows an especially preferred heat transfer grid as could exist between an array of Rijke tube pulse combustors 10 and the main tube 100. Therein numeral 200 refers to one possible layout for heat transfer pipework, for an arrangement which includes an even number of Rijke pulse tube combustors 10 disposed around the entire periphery of the main tube 100. Numeral 201 represents a pump and expansion tank for such pipework 200.

Figure 11:
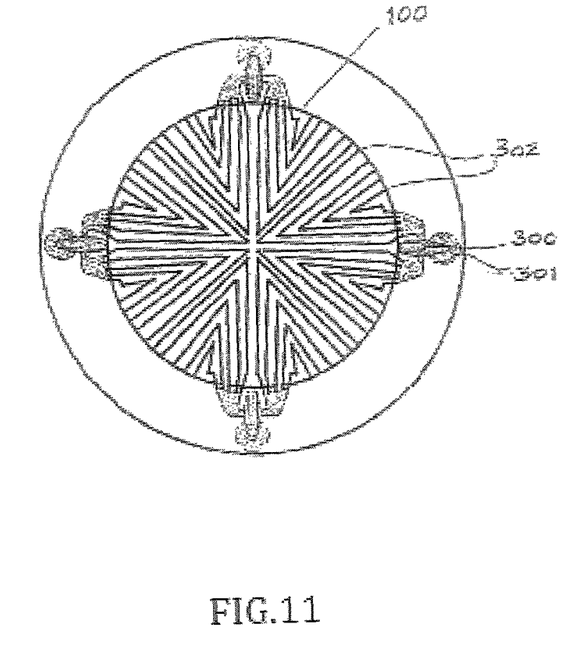
FIG. 11 is a view, similar to FIG. 7, in accordance with another embodiment of the invention but with Helmholtz type tubes rather than Rijke tubes.

FIG. 11 shows a cross-section of a variant of the embodiment of FIG. 7, with the Rijke tube pulse combustors 10 being replaced by Helmholtz pulse combustors 300, arranged around the periphery of the main tube 100. Each pulse combustor 300 includes an inlet valve, generally designated 301. The arrangement further includes a grid or array of exhaust pipes 302.

Figure 10:
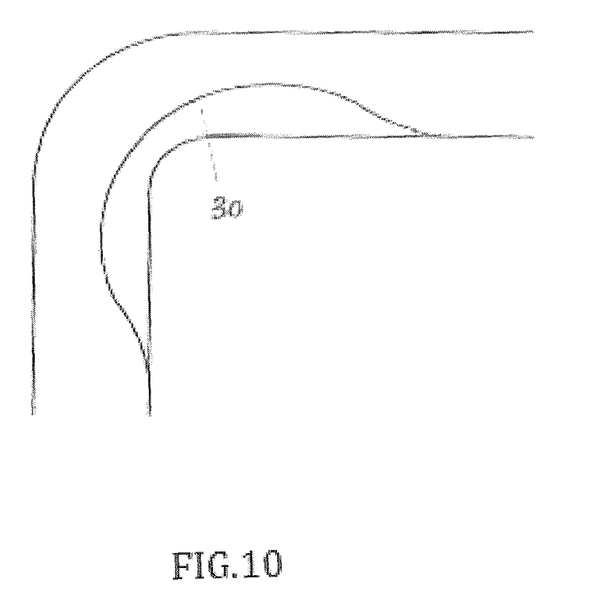
FIG. 10 is a sectional view of a top corner of a Rijke tube, having a means in place to "correct" wave flow at such corner.

The preferred embodiment of the apparatus (toroidal gas separator) in accordance with the present invention utilizes two (2) identical thermo-acoustic refrigerator tubes which are coupled together as shown, for example, in FIG. 2. These are in the form of two adapted Rijke tubes. These two tubes are coupled at the 'hot' and 'cold' ends. With reference to FIG. 2, each cooling tube 10 consists of two opposed 'hot' Stirling engines 12 with no separating membrane and two 'cold' Stirling engines 13 separated by an orifice plate 11, preferably having a plurality of orifices therein. The 'hot' and 'cold' Stirling engines 12 are arranged in tandem in each leg of the 'toroidal' tube made up of the two identical adapted Rijke tubes. By a suitable choice of the distance between the 'hot' Stirling engines 12, the 'hot' Stirling engines can be arranged to run 180° out of phase with one another. Similarly with the 'cold' Stirling engines. The 'hot' and 'cold' engines in each leg are operated in phase. As shown in FIG. 10 the inner corners of the main tube have curved fillers 30 placed in them to correct the path length for the acoustic wave. The fillers 30 function such that:

a) the pressure losses in the working gas, namely helium, in the 'toroidal' tube are reduced considerably over conventional linear tube thermo-acoustic refrigeration devices;
b) there is no need for the half-wave tubes with conventional loudspeakers, to get the cooling process started with the correct phasing in the main tube;
c) the complexity of fabricating and supporting the Stirling engine in the 'hot' top end as shown in Los Alamos design by G. Swift, et al. U.S. Pat. No. 6,644,028 B1, is eliminated; and
d) the slight de-phasing that occurs in the Stirling engine in the 'hot' top end of the Los Alamos design by G. Swift, et al., and in Chinese Patent CN 101542224 B or PCT/AU2007/001312 is eliminated.

The cold end of the 'hot' Stirling engine and hot end of the 'cold' Stirling engine are connected by pipework containing a heat transfer fluid, such as water or ethylene glycol. On the outlet side from the 'hot' engine cold end there is an air to liquid heat exchanger, as shown. This keeps the 'hot' Stirling engine cold end at as low a temperature as possible and the hot end of the 'cold' Stirling engine at as high a temperature as possible, thus maintaining the maximum power output from both the Stirling engines.

In yet another preferred embodiment, not shown the pulse combustors and heat transfer tubes may be replaced with, or by, electrical heating elements which would preferably be disposed in a flat grid across cooling tube 10.

In an especially preferred embodiment heat to the hot end of the 'hot' Stirling engine may be supplied by a set of Rijke tubes grouped around the outside of the main 'tube'. A heat transfer tube interconnects all the Rijke tube pulse combustors. The heat transfer fluid used can be any suitable fluid that can operate without deterioration in the 700 to 800° C. range.

Figure 6:
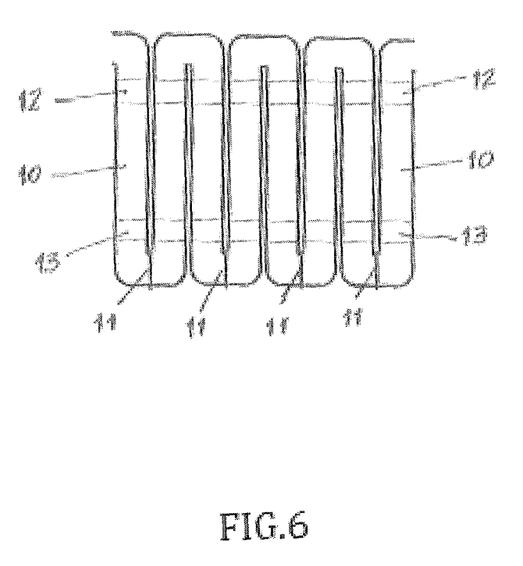
FIG. 6 is an elevational view of a linked arrangement of Rijke tubes.

An advantage of this invention is that if need be tubes can be ganged up to link 2, 4, 6, 8 . . . etc. together, as in FIG. 6. This capacity or capability is not available to any existing thermo-acoustic or quasi-thermo-acoustic refrigerators.

The apparatus in accordance with the present invention, the improved pulse tube refrigerator, exhibits a number of practical advantages when compared with the prior art, including:

(i) improved efficiency;
(ii) reduced cost in operation;
(iii) improved, faster start-up;
(iv) improved compactness, in other words actual physical size;
(v) less energy leakage at the "cold" and "hot" ends of the main tubes;
(vi) reduction in fuel requirement;

(vii) reduction in thermal stresses encountered;

(viii) the capability to be "ganged" together.

Finally, it is to be understood that the aforegoing description refers merely to preferred embodiments of the invention, and that variations and modifications will be possible thereto without departing from the spirit and scope of the invention, the ambit of which is to be determined from the following claims.

The invention claimed is:

1. A thermo-acoustic refrigerator, said refrigerator including at least one pair of pulse combustion tubes, in flow connection, each tube including two spaced-apart Stirling engines, disposed at top ends and bottom ends of said tubes wherein the bottom ends of each pair of said tubes are coupled together.

2. The thermo-acoustic refrigerator as claimed in claim 1, wherein said tubes are Rijke-type tubes.

3. The thermo-acoustic refrigerator as claimed in claim 1, wherein said tubes are Helmholtz-type tubes.

4. The thermo-acoustic refrigerator as claimed in claim 1, including a plurality of pairs of combustion tubes, arranged in flow connection in a substantially serpentine manner wherein the "cold" ends of each tube of each pair of tubes is coupled together with the "cold" end of the adjacent pair of tubes with the interposition of an orifice plate.

5. The thermo-acoustic refrigerator as claimed in claim 4, wherein said orifice plate has a plurality of orifices extending therethrough.

6. The thermo-acoustic refrigerator as claimed in claim 1, wherein the at least one pair of pulse tubes is connected/coupled together in the shape/form of a toroid.

7. The apparatus as claimed in claim 6, wherein at least part of an internal surface area of each tube is sprayed with or covered by a heat-resistant material.

8. The apparatus as claimed in claim 7, wherein said heat-resistant material is selected from a ceramic material or stabilized zirconia (PSZ).

9. The thermo-acoustic refrigerator as claimed in claim 1, including an array of linked tubes, coupled together in pairs.

10. The apparatus as claimed in claim 1, wherein said thermo-acoustic refrigerator is in the form of at least one pair of Rijke tubes, each including a "hot" end and a "cold" end Stirling engine.

* * * * *